United States Patent
Chu et al.

(10) Patent No.: US 12,429,970 B1
(45) Date of Patent: Sep. 30, 2025

(54) FULL-AREA TOUCH DEVICE

(71) Applicant: SUNREX TECHNOLOGY CORP., Taichung (TW)

(72) Inventors: Yin Chu, Chongqing (CN); Xiao-Bing Zhang, Xuangzhong Xiang (CN)

(73) Assignee: SUNREX TECHNOLOGY CORP., Taichung (TW)

( * ) Notice: Subject to any disclaimer, the term of this patent is extended or adjusted under 35 U.S.C. 154(b) by 0 days.

(21) Appl. No.: 18/889,509

(22) Filed: Sep. 19, 2024

(30) Foreign Application Priority Data

Jun. 12, 2024 (TW) ................................. 113121683

(51) Int. Cl.
*G06F 3/041* (2006.01)

(52) U.S. Cl.
CPC ................ *G06F 3/04142* (2019.05)

(58) Field of Classification Search
CPC .. G06F 1/1692; G06F 1/1643; G06F 3/04142; G06F 3/03547; G06F 1/169
See application file for complete search history.

(56) References Cited

U.S. PATENT DOCUMENTS

| | | | |
|---|---|---|---|
| 11,726,600 B1 * | 8/2023 | Chu | G06F 3/03547 345/173 |
| 11,941,190 B1 * | 3/2024 | Chu | G06F 1/1643 |

\* cited by examiner

*Primary Examiner* — Temesghen Ghebretinsae
*Assistant Examiner* — Ivelisse Martinez Quiles
(74) *Attorney, Agent, or Firm* — Thomas Horstemeyer, LLP

(57) ABSTRACT

A full-area touch device includes a supporting unit and a touch control unit. The supporting unit includes a base plate having an intermediate portion, two side frame portions, and two pairs of extended rod portions respectively connected to opposite sides of the side frame portions, and two resilient sheet sets. Each resilient sheet set has a floating plate that is connected to a respective pair of the extended rod portions, and two resilient sheets that are connected to the floating plate, and that are respectively secured to the respective pair of the extended rod portions, to which the floating plate is connected. The touch control unit is disposed on the floating plates of the resilient sheet sets, and is downwardly pressable from a starting position to a pressed position for driving a resilient movement of at least one of the floating plates of the resilient sheet sets.

5 Claims, 9 Drawing Sheets

FULL-AREA TOUCH DEVICE

CROSS-REFERENCE TO RELATED APPLICATION

This application claims priority to Taiwanese Invention Patent Application No. 113121683, filed on Jun. 12, 2024, the entire disclosure of which is incorporated by reference herein.

FIELD

The disclosure relates to the computer technology field, and more particularly to a full-area touch device for a notebook computer.

BACKGROUND

Referring to FIGS. 1 and 2, a conventional full-area touch device as disclosed in Taiwanese Invention Patent No. I829541B includes a supporting unit 91 and a touch control unit 92. The supporting unit 91 includes a bottom plate 93, a base plate 94, and two resilient sheet sets 95 that are connected to the base plate 94. The base plate 94 has a middle portion 941, and two hollowed-out portions 942 formed at two opposite sides of the middle portion 941. Each of the resilient sheet sets 95 has two resilient sheets 951 that are connected to the middle portion 941, a floating board 952 that is connected to the resilient sheets 951, and two blocking plates 953 that are adhered to the floating board 952. Each of the blocking plates 953 has a protrusion 954, and the base plate 94 limits movement of the protrusions 954 of the blocking plates 953. The touch control unit 92 is disposed on the floating boards 952 of the resilient sheet sets 95, and is downwardly pressable in order to drive the resilient sheet sets 95 to move downwardly relative to the base plate 94. The touch control unit 92 includes a touch panel 921 that has four corners, and a tact switch 922 that is disposed below the touch panel 921.

Each of the resilient sheets 951 is inclined by a resilient angle (θ) relative to the middle portion 941, in order to abut resiliently the protrusion 954 of each of the blocking plates 953 against a bottom surface of the base plate 94.

However, since each of the resilient sheets 951 has a slender shape, and since the resilient angle (θ) of each of the resilient sheets 951 affects a height from a respective one of the corners of the touch panel 921 to the supporting unit 91, when there is a discrepancy between the resilient angles (θ), there will be an obvious difference between the heights, which may result in difficult actuation of the tact switch 922 in a certain position when the touch panel 921 is pressed down. Such certain position, in which the tact switch 922 is difficult to be actuated when the touch panel 921 is pressed down, is called a void position. Hence, there is a strict precision requirement for the resilient angles (θ) during manufacturing of the conventional full-area touch device, which requires a high level of skill and high quality equipment, and thus increases the manufacturing cost.

Furthermore, when the touch panel 921 is pressed down to trigger the tact switch 922, the tact switch 922 generates downward vibrations. When the touch panel 921 is released, the tact switch 922 upwardly biases the touch panel 921 and generates upward vibrations. The upward and downward vibrations cause the resilient sheets 951 to resonate and generate noise, and the slender shape of each of the resilient sheets 951 causes greater resonances of the resilient sheets 951, which results in louder noises when the touch panel 921 is pressed.

Moreover, each of the blocking plates 953 is distanced far away from the middle portion 941, and for each of the blocking plates 953, a resistance arm between the blocking plate 953 and the tact switch 922 is long; thus, a distance between each of the corners of the touch panel 921 and the bottom plate 93 is long. Hence, when a user presses down on a corner or an edge of the touch panel 921 close to the corners to trigger the tact switch 922, the resistance arm is long, so a pressing stroke for triggering the tact switch 922 is long, which results in negative user experience.

SUMMARY

Therefore, an object of the disclosure is to provide a full-area touch device that can alleviate at least one of the drawbacks of the prior art.

According to the disclosure, the full-area touch device includes a supporting unit and a touch control unit. The supporting unit includes a base plate and two resilient sheet sets. The base plate has an intermediate portion, two side frame portions connected respectively to opposite sides of the intermediate portion in a front-rear direction, and two pairs of extended rod portions respectively connected to opposite sides of the side frame portions in a left-right direction that is transverse to the front-rear direction. Each resilient sheet set has a floating plate and two resilient sheets. The floating plate extends in the front-rear direction and is connected to a respective pair of the extended rod portions. The resilient sheets are connected to the floating plate, are spaced apart in the front-rear direction, and are respectively secured to the respective pair of the extended rod portions, to which the floating plate is connected. The touch control unit is disposed on the floating plates of the resilient sheet sets, and is downwardly pressable from a starting position to a pressed position for driving a resilient movement of at least one of the floating plates of the resilient sheet sets.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
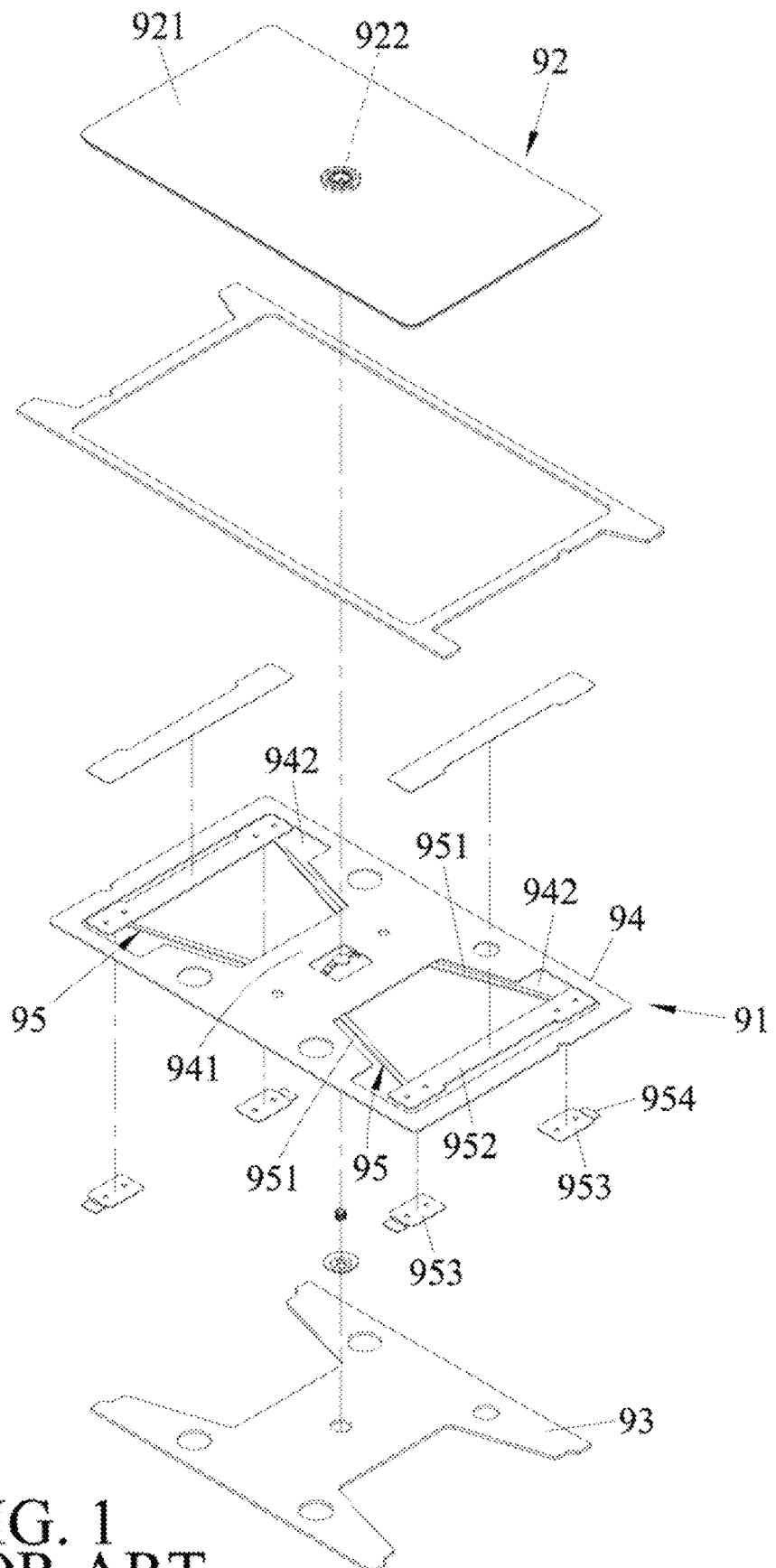
FIG. 1 is an exploded perspective view illustrating a conventional full-area touch device as disclosed in Taiwanese Invention U.S. Pat. No. 1,829,541B.
Figure 2:
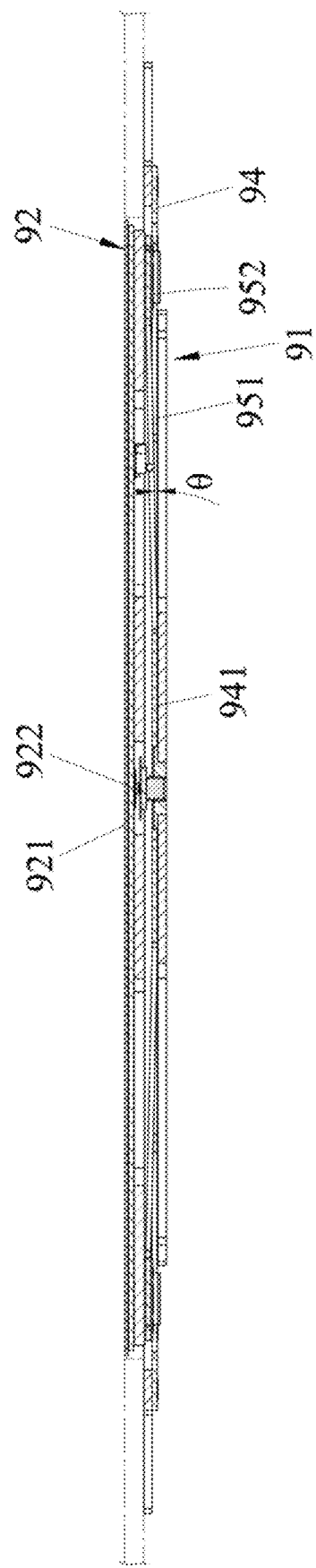
FIG. 2 is a fragmentary sectional view illustrating the conventional full-area touch device.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 3:
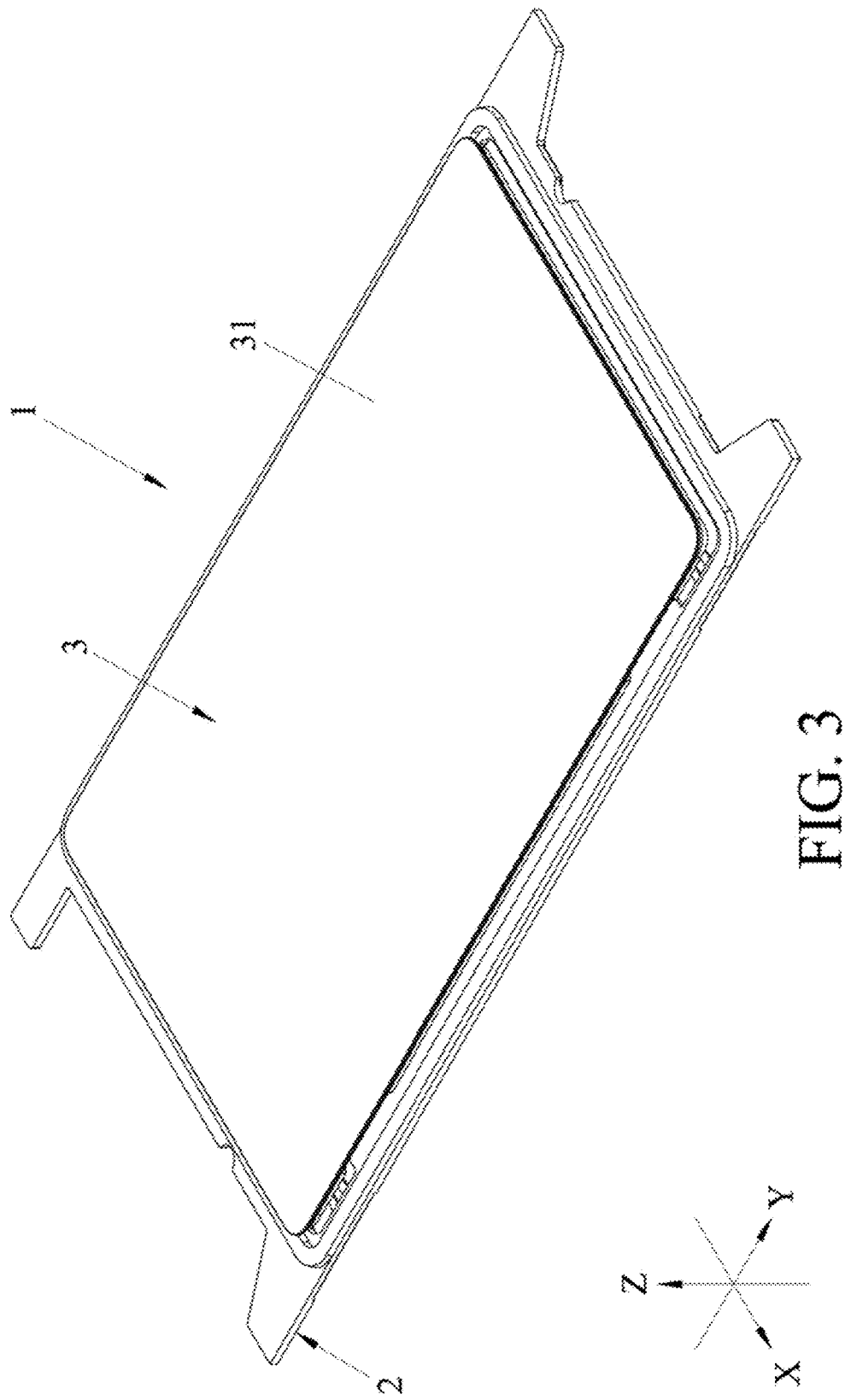
FIG. 3 is a perspective view illustrating an embodiment of a full-area touch device according to the disclosure.

It should be noted that, a front-rear direction (X), a left-right direction (Y), and an up-down direction (Z) are as shown in FIG. 3. The left-right direction (Y) is perpendicular to the front-rear direction (X), and the up-down direction (Z) is perpendicular to the front-rear direction (X) and the left-right direction (Y).

Figure 4:
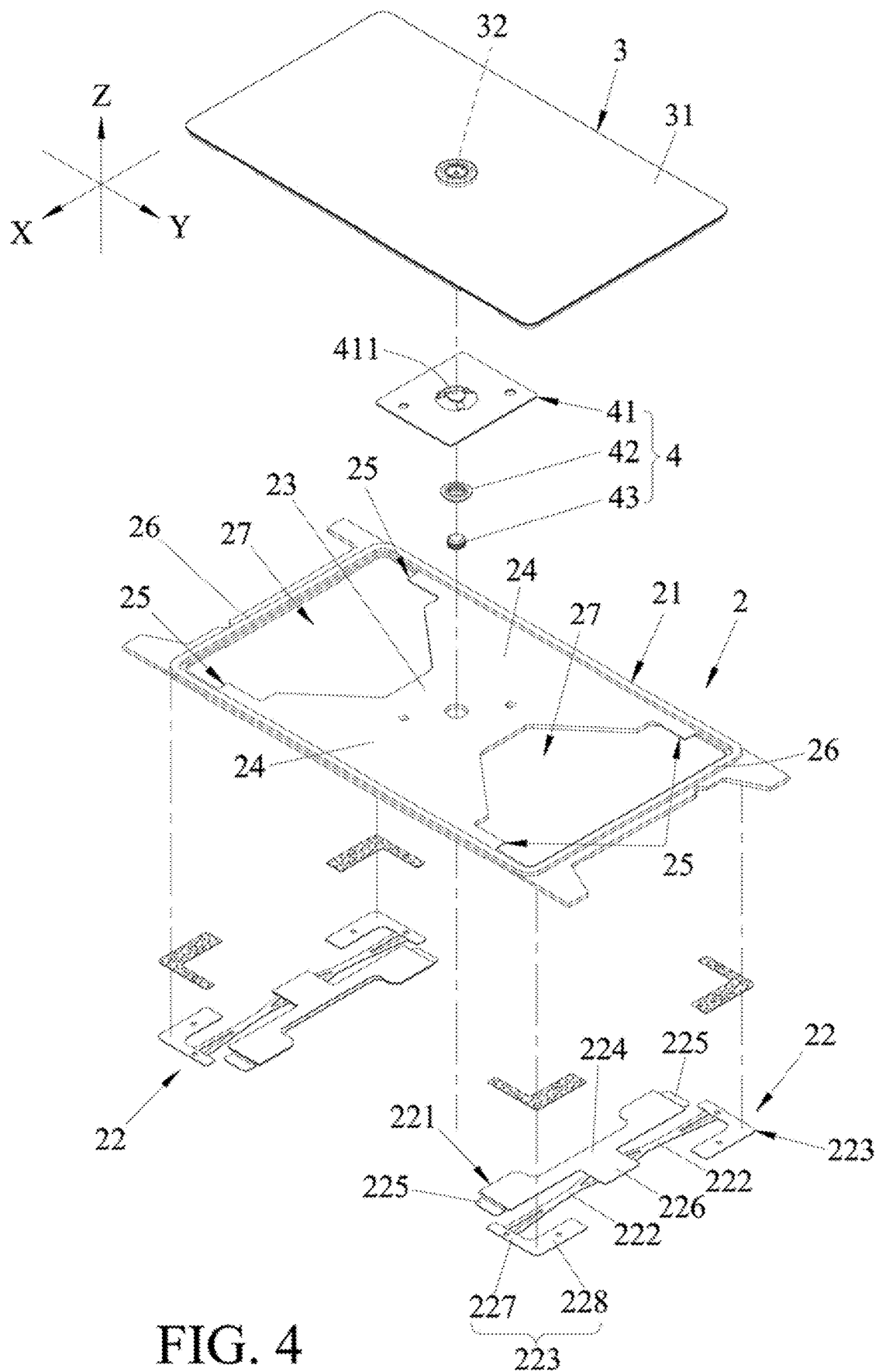
FIG. 4 is an exploded perspective view of the embodiment.

Referring to FIGS. 3 and 4, an embodiment of a full-area touch device 1 according to the disclosure includes a supporting unit 2, a touch control unit 3, and an adjustment unit 4.

The supporting unit 2 includes a base plate 21 and two resilient sheet sets 22 connected to the base plate 21. The base plate 21 has an intermediate portion 23, two side frame portions 24 connected respectively to opposite sides of the intermediate portion 23 in the front-rear direction (X), two pairs of extended rod portions 25 respectively connected to opposite sides of the side frame portions 24 in the left-right direction (Y), and two transverse rod portions 26 extending in the front-rear direction (X). Each of the transverse rod portions 26 is connected between a respective pair of the extended rod portions 25. The intermediate portion 23, the side frame portions 24, the extended rod portions 25, and the transverse rod portions 26 cooperatively define two hollowed-out structures 27 that are spaced apart in the left-right direction (Y).

Figure 5:
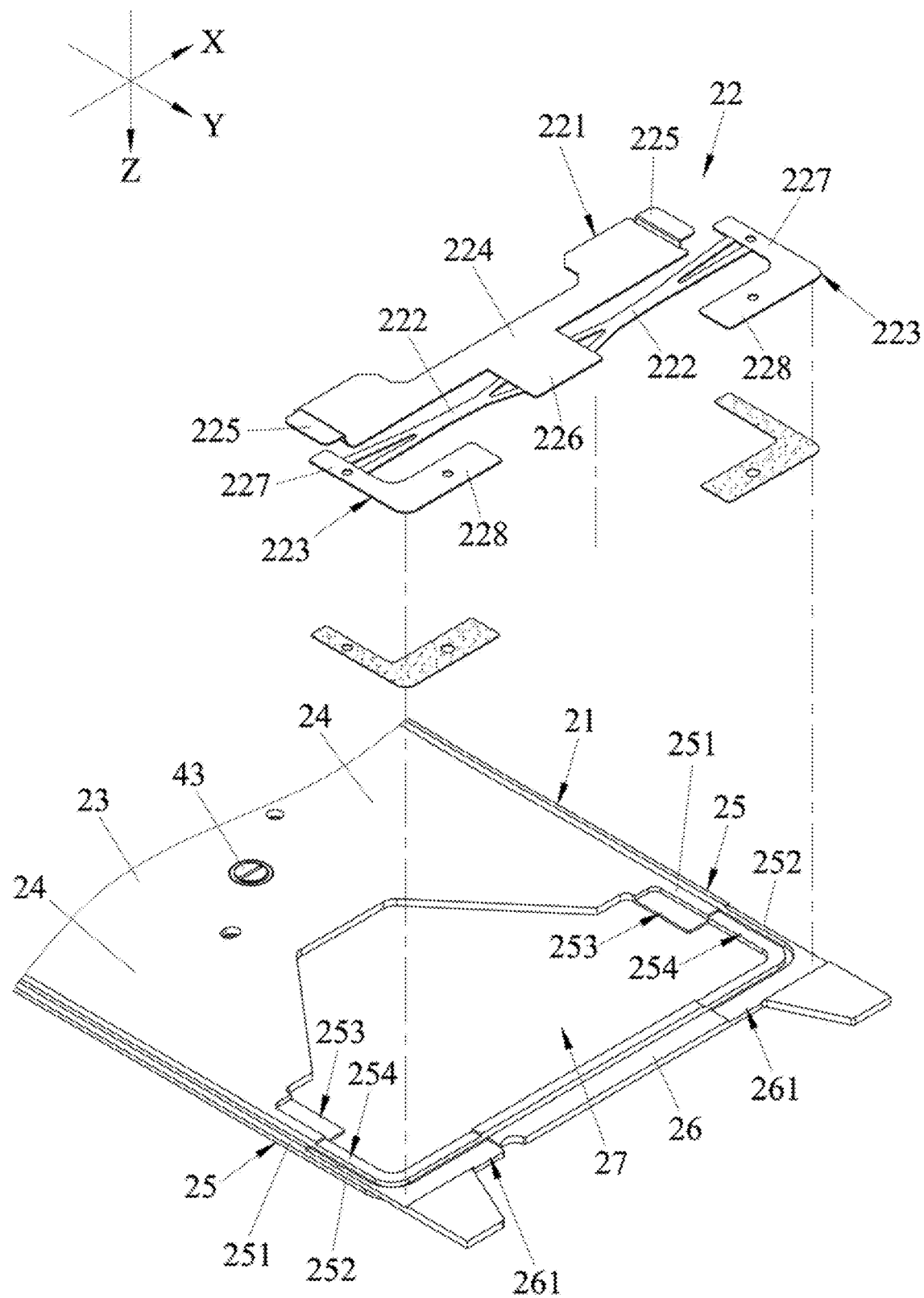
FIG. 5 is a fragmentary partly exploded perspective view of a supporting unit of the embodiment.
Figure 6:
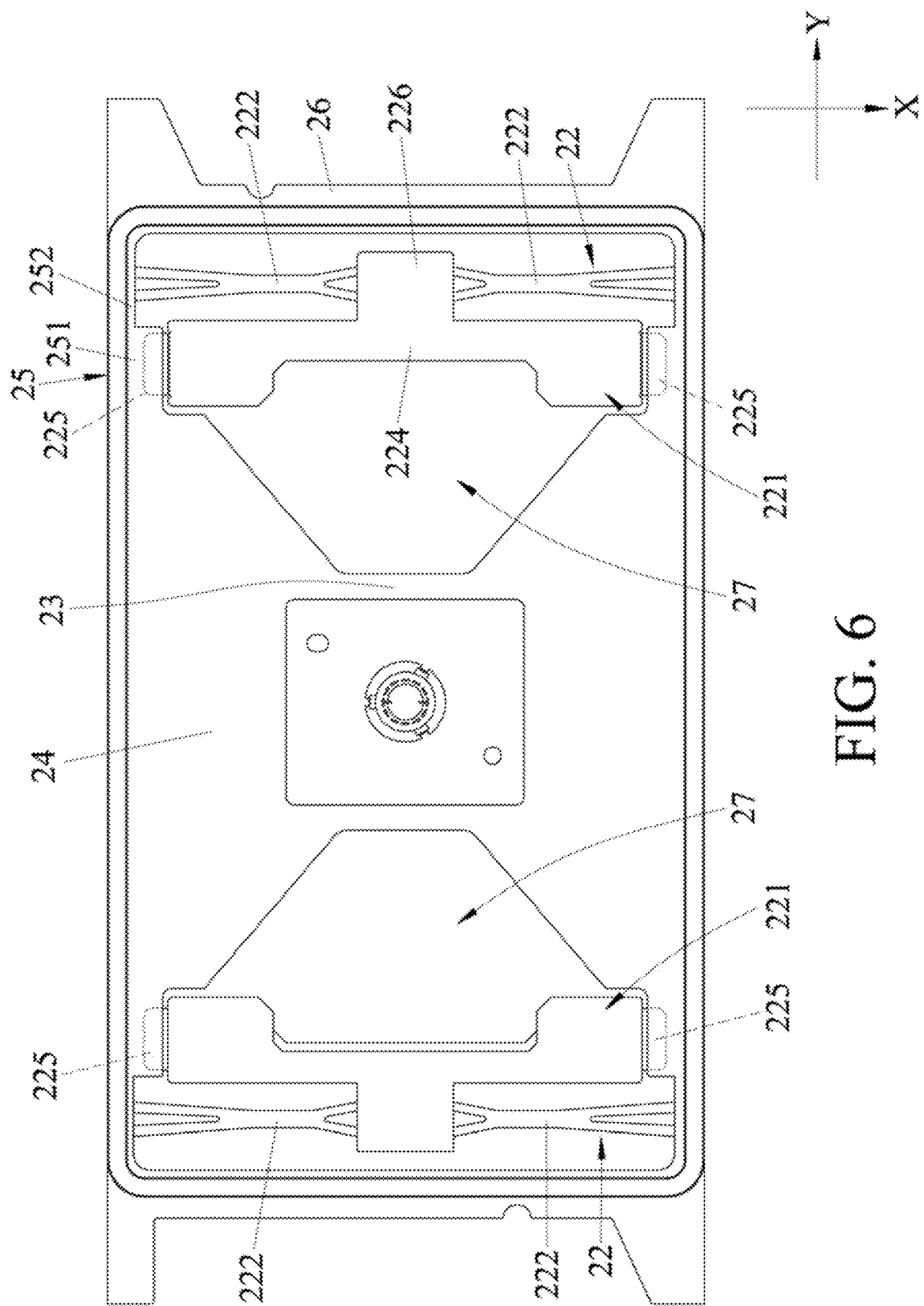
FIG. 6 is a fragmentary top view of the embodiment.

Referring to FIGS. 5 and 6, each of the extended rod portions 25 has a first extended segment 251 connected to a corresponding one of the side frame portions 24, a second extended segment 252 connected to the first extended segment 251, a first recessed region 253 formed on a bottom surface of the first extended segment 251, and a second recessed region 254 formed on a bottom surface of the second extended segment 252. For each of the extended rod portions 25, an end of the second extended segment 252 that is opposite to the first extended segment 251 is connected to the respective one of the transverse rod portions 26. For each of the extended rod portions 25, a length of the first extended segment 251 in the front-rear direction (X) is longer than a length of the second extended segment 252 in the front-rear direction (X).

Each of the transverse rod portions 26 is connected between the second extended segments 252 of the respective pair of the extended rod portions 25, and has two third recessed regions 261 that are spaced apart from each other in the front-rear direction (X), and that are respectively connected to the second recessed regions 254 of the respective pair of the extended rod portions 25. For each of the transverse rod portions 26, each of the third recessed regions 261 cooperates with the respective one of the second recessed regions 254 of the respective pair of the extended rod portions 25 to define a recessed area that has an L shape. In this embodiment, the first recessed regions 253, the second recessed regions 254, and the third recessed regions 261 are formed through stamping.

Figure 7:
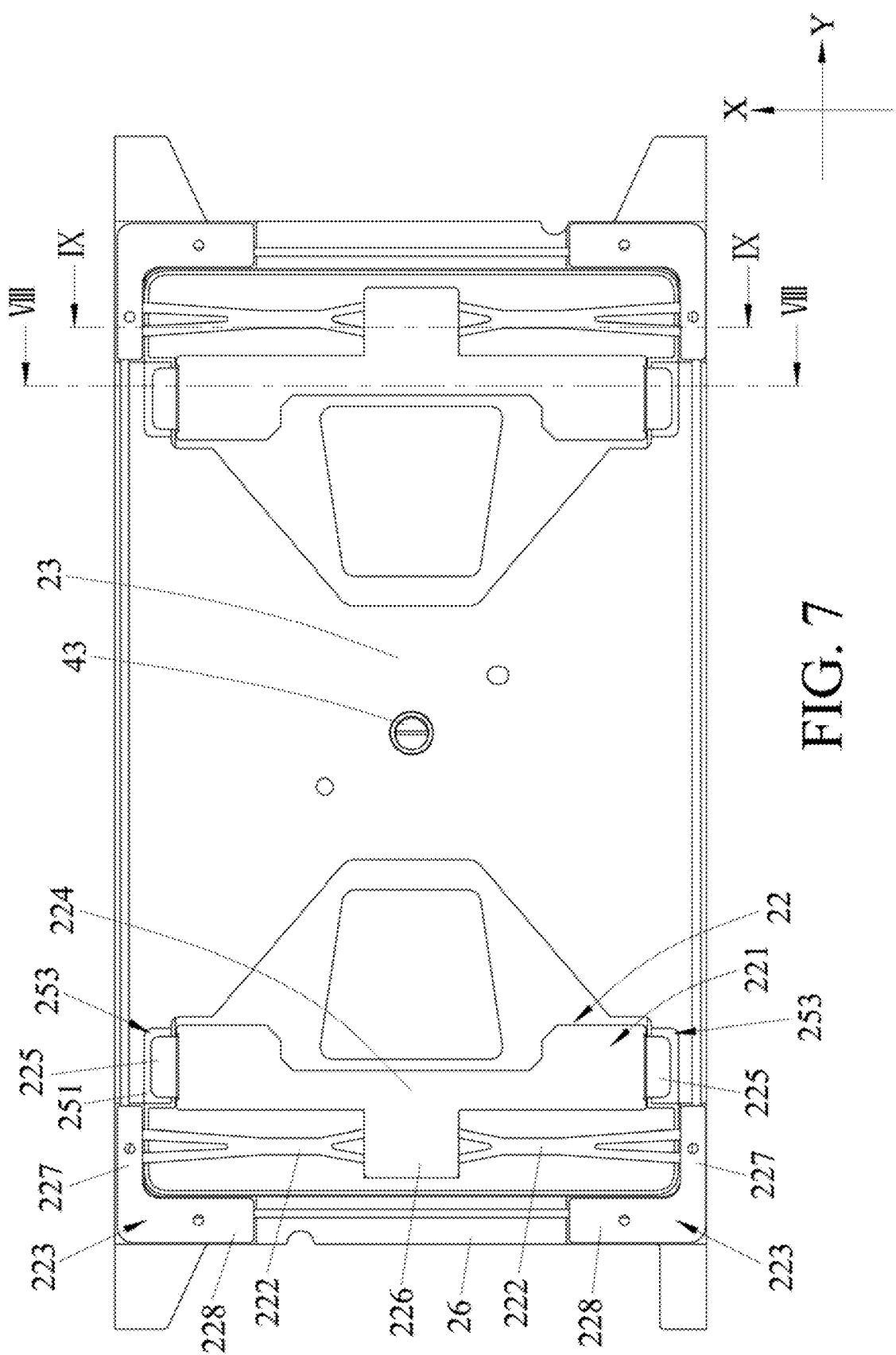
FIG. 7 is a bottom view of the embodiment.
Figure 8:
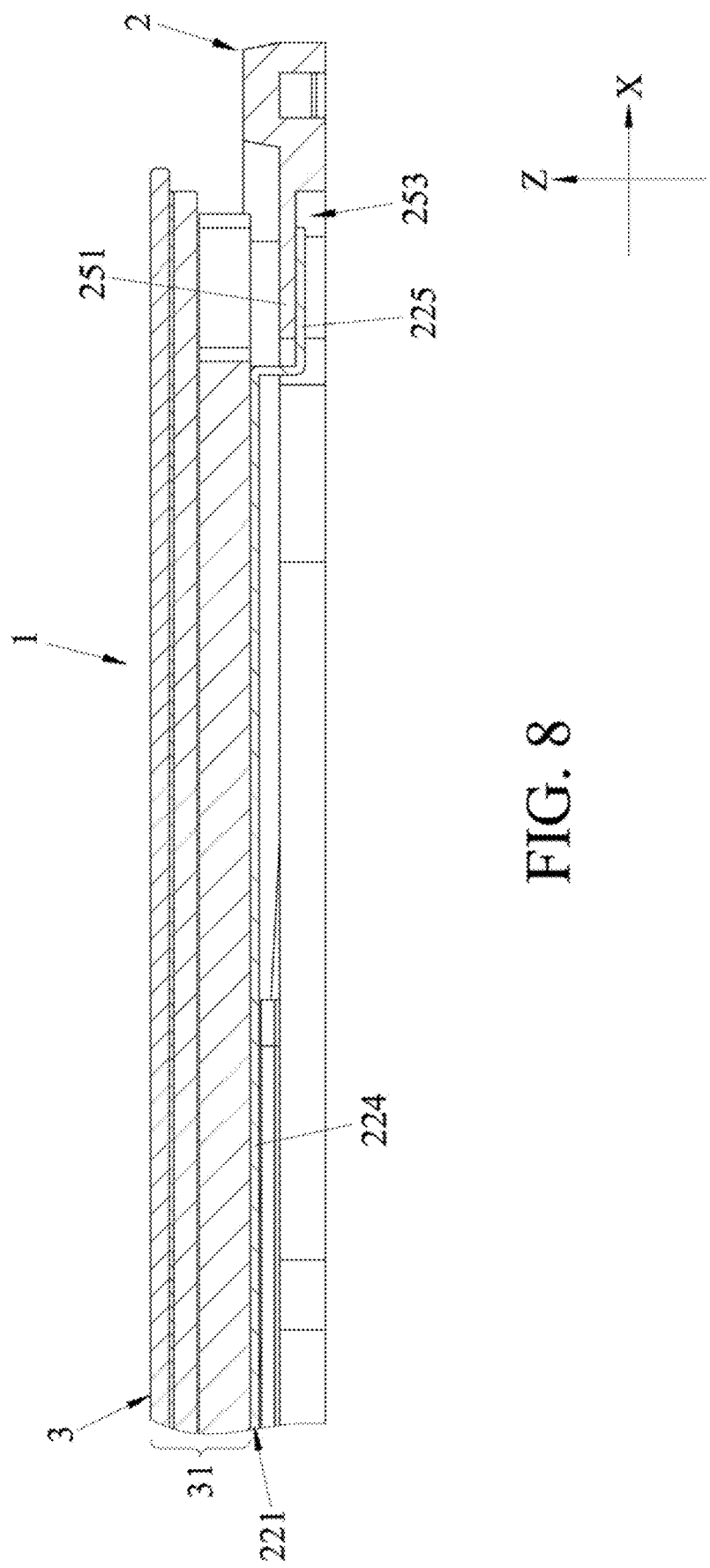
FIG. 8 is a fragmentary sectional view of the embodiment taken along line VIII-VIII in FIG. 7.

Referring to FIGS. 5, 7 and 8, the resilient sheet sets 22 are connected to opposite two sides of the base plate 21, and each of the resilient sheet sets 22 is disposed in a respective one of the hollowed-out structures 27. In this embodiment, each resilient sheet set 22 is integrally formed and made of 0.2 mm thick stainless steel. Each resilient sheet set 22 has a floating plate 221 that extends in the front-rear direction (X) and that is connected to a respective pair of the extended rod portions 25, two resilient sheets 222 that are connected to the floating plate 221 and that are spaced apart in the front-rear direction (X), and two positioning plates 223 that are respectively fixed to the respective pair of the extended rod portions 25 (to which the floating plate 221 is connected). In other words, the resilient sheets 222 are respectively secured to the respective pair of the extended rod portions 25 (to which the floating plate 221 is connected). The floating plate 221 of each of the resilient sheet sets 22 has a connecting portion 224, two limiting portions 225 that are respectively connected to opposite ends of the connecting portion 224 in the front-rear direction (X), and a protruding portion 226 that extends from a middle portion of the connecting portion 224 and that has two opposite ends in the front-rear direction (X). Movement of the limiting portions 225 of the floating plate 221 of each of the resilient sheet sets 22 is limited by the first recessed regions 253 of the respective pair of the extended rod portions 25. For each of the resilient sheet sets 22, the limiting portions 225 are respectively accommodated in and are respectively in contact with the first recessed regions 253 of the respective pair of the extended rod portions 25.

Referring to FIG. 5, for each of the resilient sheet sets 22, the resilient sheets 222 are elongated in the front-rear direction (X) and extend respectively from the opposite ends of the protruding portion 226 of the floating plate 221. In this embodiment, each of the resilient sheets 222 has an X shape, and is made of 0.2 mm thick stainless steel. In other embodiments, the shape, material, and thickness of each of the resilient sheets 222 may be adjusted as needed.

Figure 9:
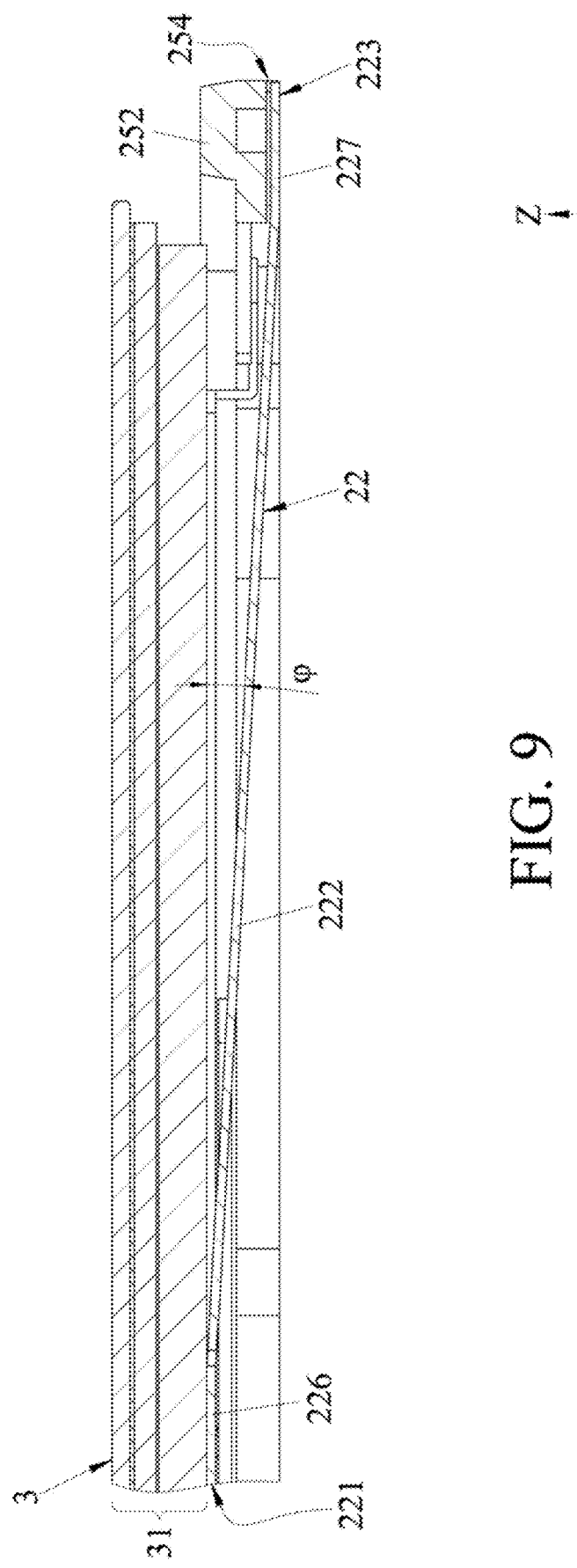
FIG. 9 is a fragmentary sectional view of the embodiment taken along line IX-IX in FIG. 7.

Referring to FIGS. 5, 7 and 9, for each of the resilient sheet sets 22, each of the positioning plates 223 is L-shaped, and has a first positioning segment 227 that is connected to a distal end of a respective one of the resilient sheets 222 (specifically, the distal end of each of the resilient sheets 222 is opposite to the protruding portion 226), and a second positioning segment 228 that extends transversely from the first positioning segment 227. For each of the resilient sheet sets 22, the first positioning segments 227 of the positioning plates 223 extend in the left-right direction (Y), and are respectively accommodated in and fixed to the second recessed regions 254 of a respective pair of the extended rod portions 25. For each of the resilient sheet sets 22, the second positioning segments 228 of the positioning plates 223 extend in the front-rear direction (X), and are respectively accommodated in and fixed to the third recessed regions 261 of a respective one of the transverse rod portions 26. Each of the positioning plates 223 is adhered to the base plate 21.

In other embodiments, the positioning plates 223 of each of the resilient sheet sets 22 may be omitted, and the distal ends of the resilient sheets 222 may be directly and respectively connected to the respective pair of the extended rod portions 25.

Referring to FIG. 9, it should be noted that, for each of the resilient sheet sets 22, each of the resilient sheets 222 is inclined by a resilient angle (q) relative to the protruding portion 226, and the resilient sheets 222 provide a resilient force that biases the floating plate 221 upwards.

Referring to FIG. 4, the touch control unit 3 includes a touch pad set 31, and a tact switch 32 disposed at a bottom of the touch pad set 31. The touch pad set 31 is disposed on the floating plates 221 of the resilient sheet sets 22, and is downwardly pressable to convert the touch control unit 3 from a starting position (see FIGS. 8 and 9) to a pressed position (not shown) for driving a resilient movement of at least one of the floating plates 221 of the resilient sheet sets 22.

The adjusting unit 4 is disposed on the supporting unit 2, and has an adjusting member 41 disposed on a top surface of the intermediate portion 23 of the base plate 21, a nut member 42 embedded in the intermediate portion 23, and a screw member 43 extending in the up-down direction (Z) and screwed to the nut member 42. The adjusting member 41 has a limiting plate 411 disposed away from a top surface of the intermediate portion 23 and being upwardly and downwardly movable. The screw member 43 abuts against a bottom surface of the limiting plate 411, and a top surface of the limiting plate 411 corresponds in position to and is spaced apart from the tact switch 32. By adjusting a distance between the limiting plate 411 and the intermediate portion 23 through rotating the screw member 43, a distance in the up-down direction (Z) between the top surface of the limiting plate 411 and the tact switch 32 is adjusted, thereby adjusting a length of a pressing stroke of the tact switch 32.

The following description may be helpful in further understanding the generated effects of the components of the disclosure, the technical methods that are utilized, and the objective that is expected to be achieved.

Referring to FIGS. 4, 8 and 9, when the touch control unit 3 is in the starting position relative to the supporting unit 2 (i.e., when the touch pad set 31 is not pressed down), the floating plates 221 of the resilient sheet sets 22 are upwardly biased by the resilient sheets 222 of the resilient sheet sets 22, and the limiting portions 225 of the floating plate 221 of each of the resilient sheet sets 22 respectively abut against the first recessed regions 253 of the respective pair of the extended rod portions 25, so that the supporting unit 2 limits movement of the touch pad set 31. At this time, the tact switch 32 is not in contact with the limiting plate 411, and the tact switch 32 is not triggered.

During movement of the touch control unit 3 to the pressed position, a user exerts a pressing force onto the touch pad set 31, and the touch pad set 31 moves downwardly towards the base plate 21 to drive each of the floating plates 221 of the resilient sheet sets 22 to move downwardly into the respective one of the hollowed-out structures 27. When the touch control unit 3 is in the pressed position, the limiting portions 225 proximate to an area where the touch pad set 31 is pressed down move away from the corresponding first extended segments 251, and the corresponding resilient sheets 222 are resiliently deformed. At this time, the tact switch 32 is in contact with the limiting plate 411 and is triggered, which generates a trigger signal.

When the pressing force exerted on the touch pad set 31 is released, the resilient force generated by the corresponding resilient sheets 222 biases the touch pad set 31 to convert touch control unit 3 towards the starting position as shown in FIGS. 8 and 9.

Hence, since each of the resilient sheets 222 has a shorter structure compared to each of the resilient sheets of the aforementioned conventional full-area touch device, for each of the resilient sheet sets 22, there is a greater tolerance towards an error for each of the resilient angles ($\varphi$), which reduces the chances of a height discrepancy between the corners of the touch pad set 31 and the supporting unit 2 when the touch pad set 31 is pressed, thereby reducing the occurrence of void positions, and improving user experience. Hence, during manufacturing of the full-area touch device 1, the accuracy requirements for the resilient angles ($\varphi$) are lower, saving the production cost.

Since each of the resilient sheet sets 22 is made of 0.2 mm thick stainless steel, and is integrally formed, the resilient sheets 222 of the resilient sheet sets 22 are relatively light, short and wide, and therefore have firm structures, so that when the touch pad set 31 is pressed down, the resilient sheets 222 will not easily resonate with the vibrations the tact switch 32 generates, and will not generate noise accordingly.

Compared to the aforementioned conventional full-area touch device where the blocking plates and the floating boards are independent components, for each of the resilient sheet sets 22, the limiting portions 225 and the connecting portion 224 of the floating plate 221 are integrally formed, which allows the structure thereof to be lighter and assembly time thereof to be shorter, thereby saving the production cost. Furthermore, compared to the aforementioned conventional full-area touch device, since the limiting portions 225 of each of the floating plates 221 are more proximate to the intermediate portion 23 in the left-right direction (Y), and for each of the limiting portions 225, the resistance arm between the limiting portion 225 and the tact switch 32 is shorter, the distance between each of the corners and edges of the touch pad set 31 and the base plate 21 is shorter in the up-down direction (Z), so that when the user presses down on a corner or an edge of the touch pad set 31, the length of the pressing stroke required to trigger the tact switch 32 is shorter, thereby improving user experience.

Moreover, the resilient sheets sets 22 are disposed on the base plate 21, and since the first recessed regions 253 respectively accommodate the limiting portions 225 of the floating boards 221, and since the second recessed regions 254 and the third recessed regions 261 respectively accommodate the first positioning segments 227 and the second positioning segments 228, a thickness of the full-area touch device 1 in the up-down direction (Z) is reduced. Hence, an objective of the disclosure is achieved.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A full-area touch device comprising:
   a supporting unit that includes
      a base plate having
         an intermediate portion,
         two side frame portions that are connected respectively to opposite sides of said intermediate portion in a front-rear direction, and
         two pairs of extended rod portions that are respectively connected to opposite sides of said side frame portions in a left-right direction transverse to the front-rear direction, and
      two resilient sheet sets, each resilient sheet set having
         a floating plate that extends in the front-rear direction and that is connected to a respective pair of said extended rod portions, and
         two resilient sheets that are connected to said floating plate, that are spaced apart in the front-rear direction, and that are respectively secured to the respective pair of said extended rod portions, to which said floating plate is connected; and
   a touch control unit that is disposed on said floating plates of said resilient sheet sets, and that is downwardly pressable from a starting position to a pressed position for driving a resilient movement of at least one of said floating plates of said resilient sheet sets;
   wherein, for each of said resilient sheet sets, said floating plate has a connecting portion, and a protruding portion extending from a middle portion of said connecting portion and having two opposite ends in the front-rear direction; and
   wherein, for each of said resilient sheet sets, said resilient sheets are elongated in the front-rear direction and extend respectively from said opposite ends of said protruding portion, each of said resilient sheets having a distal end that is opposite to said protruding portion and that is connected to a respective one of the respective pair of said extended rod portions.

2. The full-area touch device as claimed in claim 1, wherein said floating plate of each of said resilient sheet sets further has two limiting portions that are respectively connected to opposite ends of said connecting portion in the front-rear direction, a movement of said limiting portions of said floating plate of each of said resilient sheet sets being limited by the respective pair of said extended rod portions.

3. The full-area touch device as claimed in claim 2, wherein:
   each of said extended rod portions has a first extended segment connected to a corresponding one of said side frame portions, and a first recessed region formed on a bottom surface of said first extended segment; and
   for each of said resilient sheet sets, said limiting portions are respectively accommodated in and are respectively in contact with said first recessed regions of the respective pair of said extended rod portions.

4. The full-area touch device as claimed in claim 3, wherein:
   each of said extended rod portions further has a second extended segment connected to said first extended segment, and a second recessed region formed on a bottom surface of said second extended segment;
   each of said resilient sheet sets further has two positioning plates, each of said positioning plates having a first positioning segment that is connected to a respective one of said resilient sheets; and
   for each of said resilient sheet sets, said first positioning segments of said positioning plates are respectively accommodated in and fixed to said second recessed regions of the respective pair of said extended rod portions.

5. The full-area touch device as claimed in claim 4, wherein:
   said base plate further has two transverse rod portions that extend in the front-rear direction, each of said transverse rod portions being connected between the respective pair of said extended rod portions, and having two third recessed regions that are spaced apart from each other in the front-rear direction, and that are respectively connected to said second recessed regions of the respective pair of said extended rod portions;
   each of said positioning plates further has a second positioning segment extending from said first positioning segment; and
   for each of said resilient sheet sets, said second positioning segments of said positioning plates are respectively accommodated in and fixed to said third recessed regions of a respective one of said transverse rod portions.

* * * * *